(12) United States Patent
Joseph, III

(10) Patent No.: US 7,013,917 B2
(45) Date of Patent: Mar. 21, 2006

(54) ROTARY VALVE

(76) Inventor: Thomas Anthony Joseph, III, 2330A Brynmahr Dr., Tallahassee, FL (US) 32303

(*) Notice: Subject to any disclaimer, the term of this patent is extended or adjusted under 35 U.S.C. 154(b) by 0 days.

(21) Appl. No.: 10/324,508

(22) Filed: Jun. 5, 2003

(65) Prior Publication Data

US 2004/0244851 A1 Dec. 9, 2004

(51) Int. Cl.
*F16K 11/087* (2006.01)

(52) U.S. Cl. .............................................. 137/624.13
(58) Field of Classification Search ............ 137/624.11, 137/624.13, 625.16, 625.32; 251/315.14; 239/214
See application file for complete search history.

(56) References Cited

U.S. PATENT DOCUMENTS

| | | | |
|---|---|---|---|
| 2,312,941 A | | 3/1943 | Tucker |
| 2,749,941 A | | 6/1956 | Gardner |
| 2,878,066 A | * | 3/1959 | Erwin ..................... 299/141 |
| 3,386,461 A | * | 6/1968 | Fisher ..................... 137/237 |
| 3,774,634 A | | 11/1973 | Bonney |
| 3,906,975 A | | 9/1975 | Craig |
| 3,937,252 A | * | 2/1976 | Ishida ..................... 137/624.13 |
| 3,941,351 A | | 3/1976 | Graham |
| 4,113,228 A | | 9/1978 | Frye |
| 4,177,834 A | | 12/1979 | Bonney |
| 4,212,321 A | | 7/1980 | Hulsey |
| 4,231,545 A | | 11/1980 | Nelimarkka |
| 4,345,228 A | | 8/1982 | Idogaki et al. |
| 4,503,811 A | * | 3/1985 | Hammond .................. 122/392 |
| 4,577,830 A | | 3/1986 | Winegeart |
| 4,649,955 A | * | 3/1987 | Otto et al. ............. 137/625.13 |
| 4,658,859 A | | 4/1987 | Backe et al. |
| 4,735,233 A | | 4/1988 | Nogami et al. |
| 4,802,508 A | * | 2/1989 | Styles et al. ........... 137/624.13 |
| 4,881,574 A | * | 11/1989 | Olson et al. ........... 137/624.13 |
| 4,986,307 A | | 1/1991 | Hardee |
| 5,048,630 A | | 9/1991 | Schaffer |
| 5,255,715 A | | 10/1993 | Phillips |
| 5,273,072 A | | 12/1993 | Phillips |
| 5,305,986 A | | 4/1994 | Hunt |
| 5,524,863 A | | 6/1996 | Davis |
| 5,680,889 A | * | 10/1997 | Boger .................... 137/625.32 |
| 5,758,689 A | | 6/1998 | Leinen |
| 5,787,928 A | | 8/1998 | Allen et al. |
| 5,913,329 A | | 6/1999 | Haynes et al. |
| 5,988,586 A | | 11/1999 | Boger |
| 6,047,803 A | | 4/2000 | Pinschmidt et al. |
| 6,053,203 A | * | 4/2000 | Sailor et al. ........... 137/624.13 |
| 6,116,474 A | * | 9/2000 | Ruiz et al. .................. 222/410 |
| 6,253,778 B1 | | 7/2001 | Smolarek et al. |
| 6,269,838 B1 | | 8/2001 | Woodworth et al. |

* cited by examiner

*Primary Examiner*—John Fox (57) ABSTRACT

A high-speed, high pressure rotary valve is provided comprising a valve body, a valve element which includes a plurality of passageways therethrough that is configured to be rotatably disposed within the valve body, and means for rotating the valve element within the valve body whereby a single rotation of the valve element results in the creation of multiple discrete flow paths through the rotary valve and multiple valve actuation cycles.

13 Claims, 7 Drawing Sheets

Fig. 3

Fig. 7
Section 1-1

Fig. 4
FLOW

FLOW

Fig. 10
Section 2-2

Fig. 8

FLOW

Fig. 12
Section
3-3

Fig. 13

Fig. 14
Section
4-4

Fig. 15

Fig. 16
Section 5-5

Fig. 17

Figure 18. Narrowband Frequency Spectra for 500 psi Input

Figure 19. Pressure Signal from Kulite for 500 psi Input

Figure 20. Narrowband Frequency Spectra for 600 psi Input

Figure 21. Pressure Signal from Kulite for 600 psi Input

ROTARY VALVE

BACKGROUND

A. Field of Invention

This invention relates to the field of high pressure, high speed rotary valves. More specifically, this invention comprises a rotary valve with multiple flow paths that is capable of valve actuation cycle frequencies in excess of 2000 Hz at inlet pressures in excess of 600 psi.

B. Description of Related Art

Rotary valves are used in industry for a number of applications like controlling the flow of liquids to molds, regulating the flow of hydraulic fluids to control various machine functions, industrial process control, and controlling fluids which are directed against work pieces. The vast majority of these applications are conducted at low fluid pressures and at either low rotational speeds or through an indexed movement. These applications have been addressed through application of various known fluid regulation valve applications including gate valve, ball valves, butterfly valves, rotating shafts with various void designs and configurations, solenoid actuated valves of various designs, and valves designed with disks with multiple holes to redirect flow streams. These applications are generally acceptable for low speed, low pressure processes, but are not suitable for high speed, high pressure processes.

For example, solenoid valves are effective for regulating fluid flow up to a frequency of approximately 300 Hz at a pressure of up to 200 psi. These limitations are primarily due to the physical design of the solenoid which relies upon the reciprocating motion of magnetic contacts and is therefore subject to significant acceleration and deceleration forces, particularly at higher frequencies. These forces, the resulting jarring action, and the frictional heat generated make these type valves subject to failure at high frequencies of actuation.

Rotary valves employing multiple outlets have been used at frequencies up to 1000 Hz in applications where a low pressure differential between valve inlet and outlet ports is desired. These valves, however, are large and complex and necessarily have significant physical space requirements for the valve and for the appurtenant inlet and outlet piping.

Other methods of regulating flow force the fluid to travel through various tortuous paths, changing directions prior to exiting the device. Such a method of turning and returning the flow stream results in time delays in the output stream, significant head loss, and can be quite mechanically complicated.

Information relevant to attempts to address these problems can be found in U.S. Pat. Nos. 4,986,307, 4,345,228, 5,913,329, 6,269,838, 6,253,778, 5,988,586, 5,787,928, 5,758,689, 5,524,863, 5,305,986, 5,273,072, 5,255,715, 5,048,630, 4,658,859, 4,577,830, 4,231,545, 4,212,321, 4,177,834, 4,113,228, 3,941,351, 3,906,975, 3,774,634, 2,312,941, and 2,749,941. However, each one of these references suffers from one or more of the following disadvantages:

1. The valve actuation cycle speed (frequency) of the valve is too low;
2. The valve is large and physically complex;
3. The valve creates significant head loss;
4. The valve cannot satisfactorily operate at high inlet pressures; or
5. The valve cannot create the necessary frequency or amplitude of flow perturbation.

For the foregoing reasons, there is a need for a high-speed, high pressure rotary valve for controlling the flow of a fluid to produce high frequency fluid pulses or perturbations. Further, there is a need for such a valve which is relatively simple in design, compact in size, compatible with standardized piping systems, and suitable for high pressure applications with minimal head loss through the valve. Such a valve may be used in applications such as creating aerosols of liquids and gases (e.g., carburetion of fuels, pesticide application, paint spraying), fuel injection for engine systems, and as part of active noise cancellation systems for supersonic jet engines and other high energy noise production systems.

SUMMARY

The present invention is directed to a high-speed, high pressure rotary valve that satisfies this need. The rotary valve comprises a valve body having an inlet and an outlet and a valve element rotatably disposed within the valve body. The valve element has a plurality of passageways therethrough, and is free to rotate within the valve body. Means are provided for rotating the valve element such that each complete rotation of the valve element creates a plurality of discrete flow paths through the valve body and the valve element and a plurality of discrete valve actuation cycles.

Accordingly, several objects and advantages of the present invention are:

1. Operation at valve actuation cycle frequencies of at least 2000 Hz;
2. Operation at valve inlet pressures in excess of 600 psi;
3. Production of high energy flow perturbations;
4. Production of high sound pressure level sounds at discrete frequencies; and
5. Small size and simple piping configurations.

DRAWINGS

These and other features, aspects, and advantages of the present invention will become better understood with regard to the following description, appended claims, and accompanying drawings wherein:

DESCRIPTION

Figure 1:
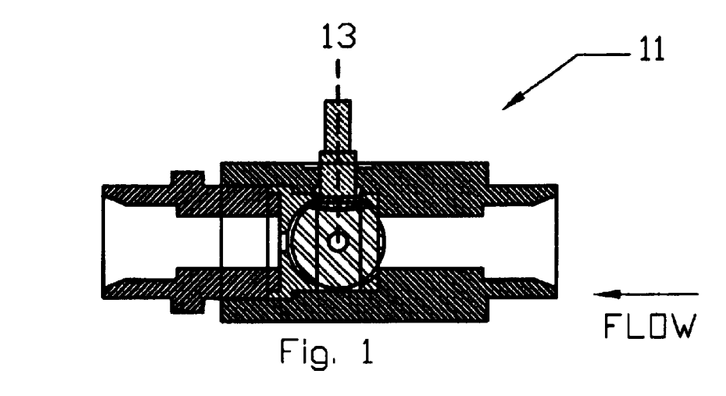
FIG. 1 shows an assembly view of the rotary valve 11 of the present invention.
Figure 2:
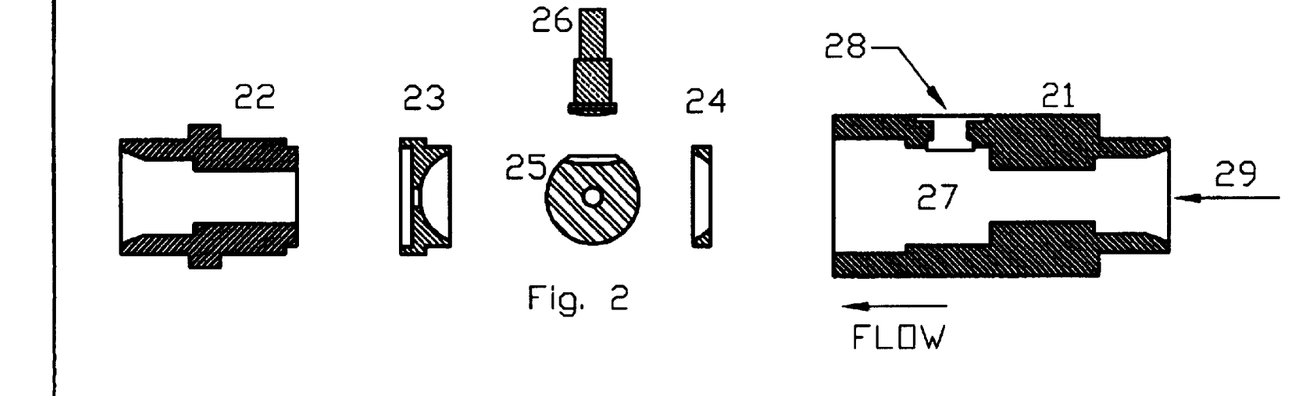
FIG. 2 shows an exploded view of the rotary valve 11 of the present invention.

With reference to FIG. 1, a rotary ball valve assembly 11 is shown, and in FIG. 2 the components of the assembly, i.e., the main valve body 21, the downstream valve body 22, the downstream valve seat 23, the upstream seat 24, the valve ball 25, and the valve stem 26, are shown.

Figure 3:
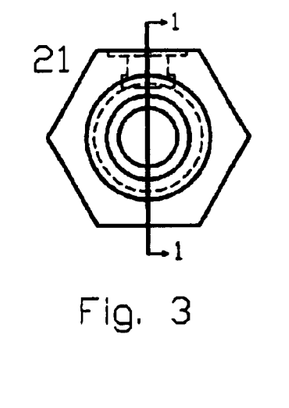
FIG. 3 shows an upstream-end view of the main valve body of the rotary valve 11 of the present invention.
Figure 4:
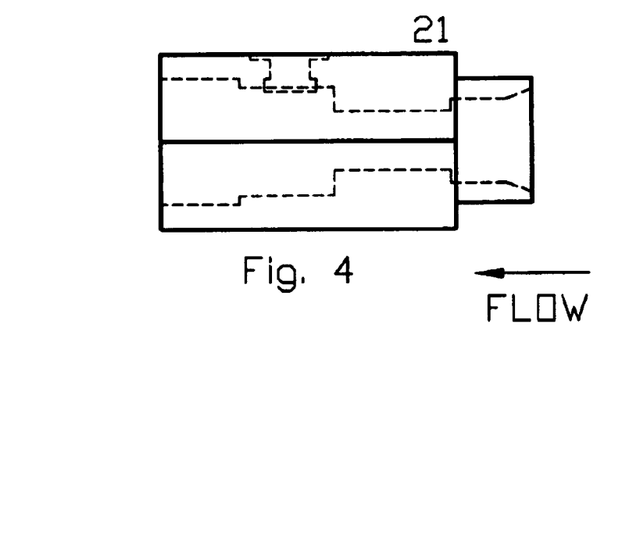
FIG. 4 shows and a side view of the main valve body of the rotary valve 11 of the present invention.
Figure 5:
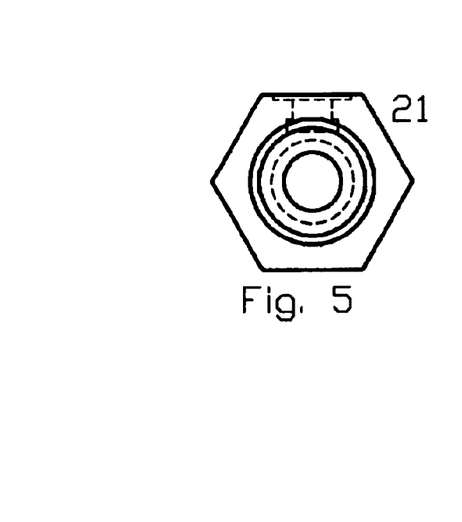
FIG. 5 shows a downstream-end view of the main valve body of the rotary valve 11 of the present invention.
Figures 6, 7:
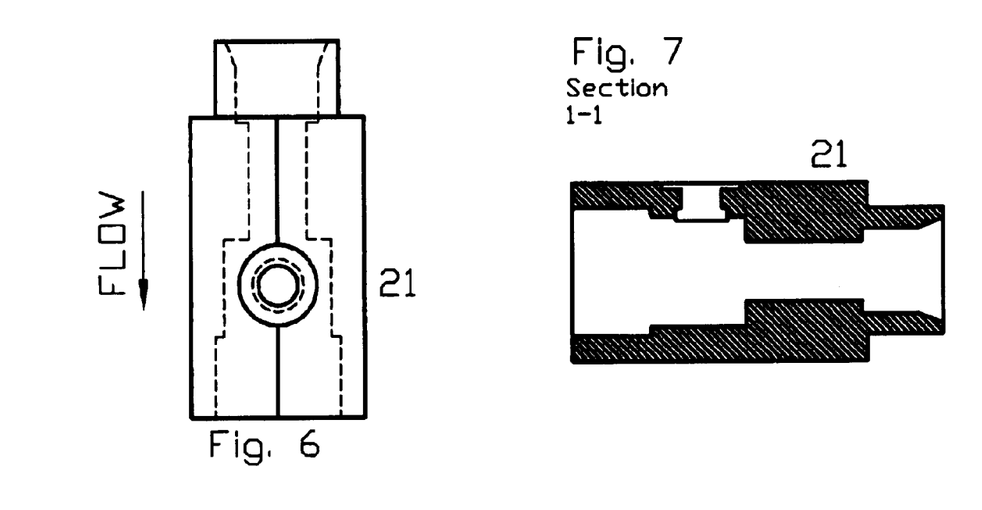
FIG. 6 shows a top view of the main valve body of the rotary valve 11 of the present invention.
FIG. 7 shows a cross-sectional elevation view, along section line "1—1" of the main valve body of the rotary valve 11 of the present invention.

With reference to FIG. 3, the upstream end of main valve body 21 is shown. FIG. 4 shows a side view of the main valve body 21, FIG. 5 shows an end view of the downstream end of main valve body 21, FIG. 6 shows a plan view of main valve body 21, and FIG. 7 shows a cross-sectional view, along section line "1—1" shown in FIG. 3, of main valve body 21.

Figure 8:
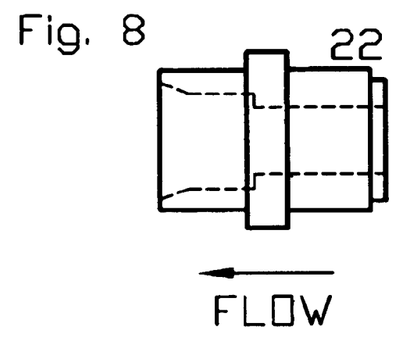
FIG. 8 shows a side view of the downstream valve body of the rotary valve 11 of the present invention.
Figure 9:
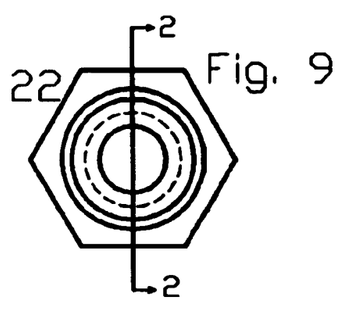
FIG. 9 shows an upstream-end view of the downstream valve body of the rotary valve 11 of the present invention.
Figure 10:
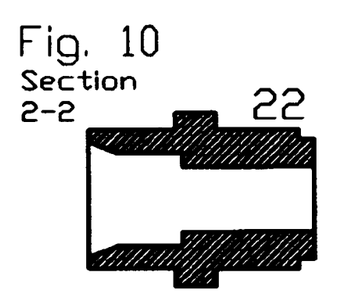
FIG. 10 shows a cross-sectional view, along section line "2—2" of the downstream valve body of the rotary valve 11 of the present invention.

With reference to FIG. 8, a side view of the downstream valve body 22 is shown. FIG. 9 shows an end view of the upstream end of the downstream valve body 22. FIG. 10 is a cross sectional view, along section line "2—2" shown in FIG. 9, of the downstream valve body 22.

FIG. 11 shows four views of the valve ball 25. FIG. 11A shows valve ball 25 with three separate flow paths therethrough. As positioned in FIG. 11A, valve ball 25 is in a closed position with respect to flow along a flow path defined by section line "3—3." FIG. 11B shows valve ball 25 in an open position with respect to flow along a flow path defined by section line "3—3" in FIG. 11A. FIG. 11C shows a side view of valve ball 25 corresponding to the top view shown in FIG. 11A, and FIG. 11D shows a side view of valve ball 25 corresponding to the top view shown in FIG. 11B. FIG. 12 shows a cross-sectional view, along section line "3—3" shown in FIG. 11A, of valve ball 25.

Figure 13:
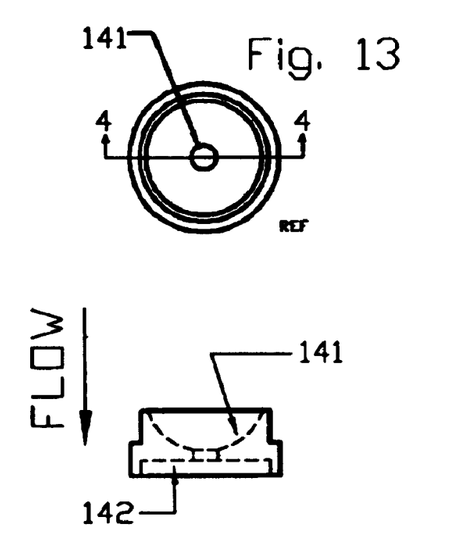
FIG. 13 shows an upstream-end view and a side view of the downstream seat of the rotary valve 11 of the present invention.
Figure 14:
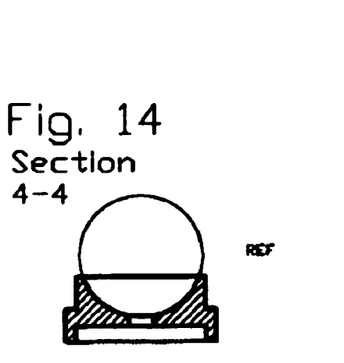
FIG. 14 shows a cross-sectional view, along section line "4—4" of the downstream seat of the rotary valve 11 of the present invention.
Figure 15:
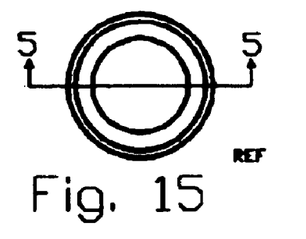
FIG. 15 shows an upstream-end view and a side view of the upstream seat of the rotary valve 11 of the present invention.
Figure 16:
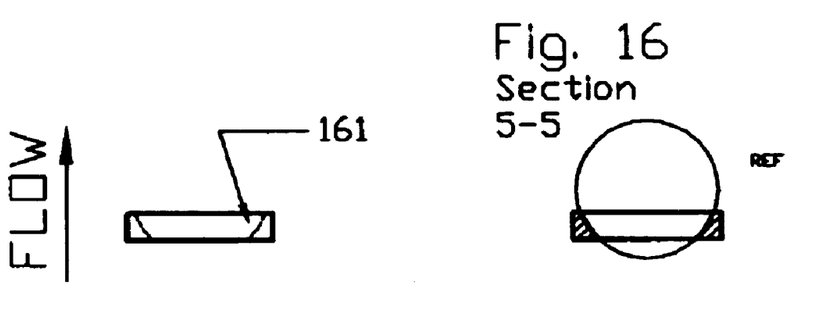
FIG. 16 shows a cross-sectional view, along section line "5—5" of the upstream seat of the rotary valve 11 of the present invention.
Figure 17:
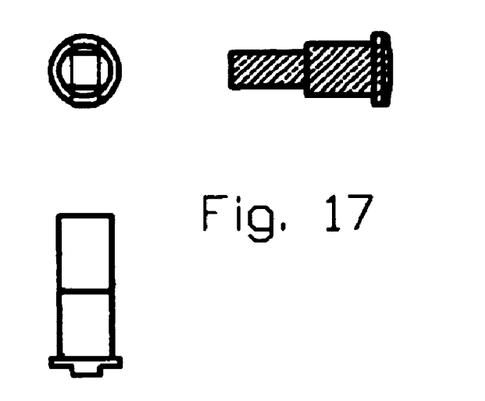
FIG. 17 shows a top view and a side view of the valve stem of the rotary valve 11 of the present invention.

FIG. 13 shows a side view and an upstream end view of downstream seat 23. FIG. 14 shows a cross-sectional view, along section line "4—4" shown in FIG. 13, of downstream seat 23. FIG. 15 shows a side view and an upstream end view of upstream seat 24. FIG. 16 shows a cross-sectional view, along section line "5—5" shown in FIG. 15, of upstream seat 24. FIG. 17 shows a side view and a top view of valve stem 26.

Figure 18:
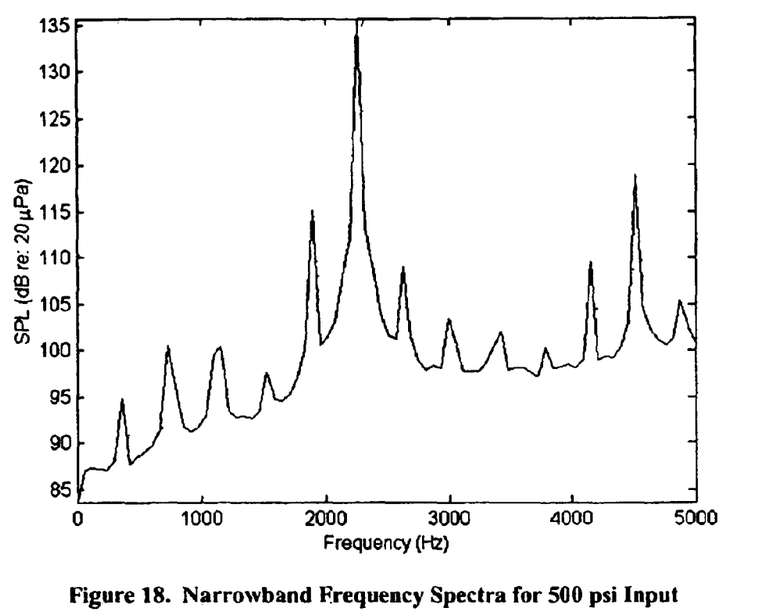
FIG. 18 shows test data of frequency (Hz) versus sound pressure level (dB) at a 500 psi input pressure.
Figure 19:
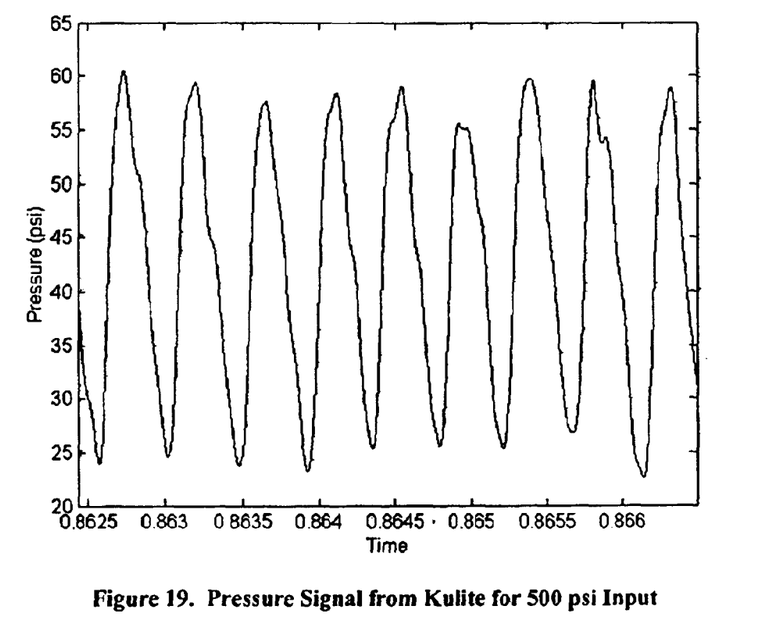
FIG. 19 shows test data of time (seconds) versus pressure (psi) at a 500 psi input pressure, with the pressure measurement taken ten diameters downstream of the valve body.
Figure 20:
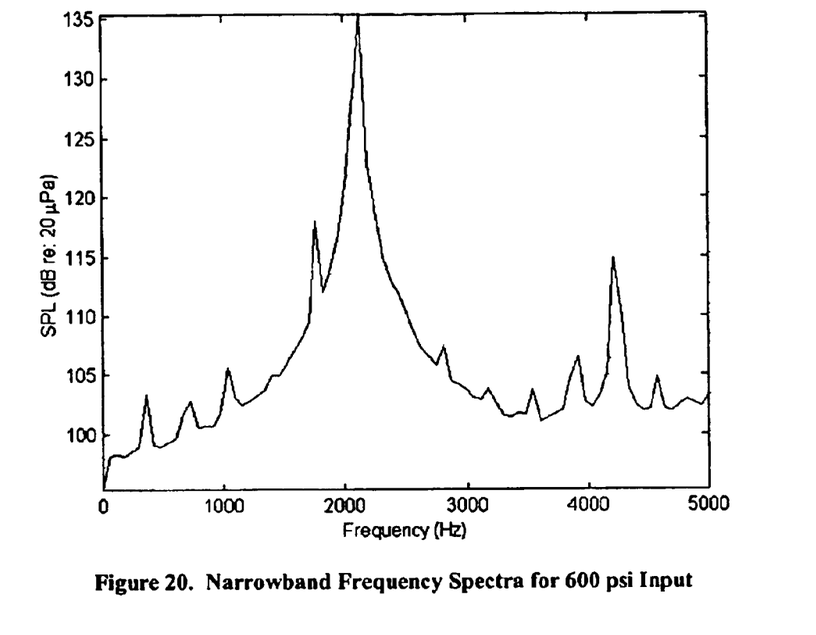
FIG. 20 shows test data of frequency (Hz) versus sound pressure level (dB) at a 600 psi input pressure.
Figure 21:
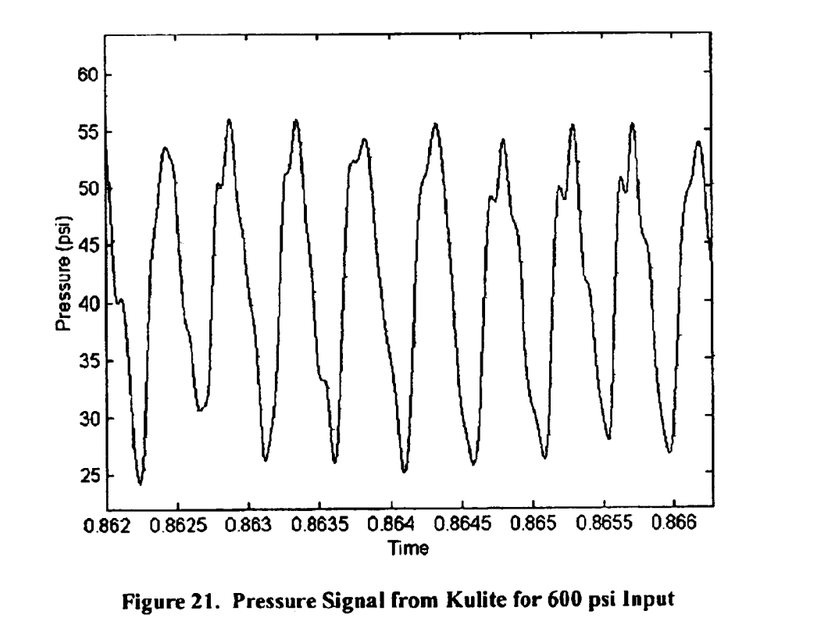
FIG. 21 shows test data of time (seconds) versus pressure (psi) at a 600 psi input pressure, with the pressure measurement taken ten diameters downstream of the valve body.

FIG. 18 and FIG. 20 show a plot of frequency (Hz) versus sound pressure level (dB) at a 500 psi (FIG. 18) and a 600 psi inlet pressure (FIG. 20) with air as the test fluid. FIG. 19 and FIG. 21 show a plot of time (seconds) versus pressure (psi) at a 500 psi inlet pressure (FIG. 19) and at a 600 psi inlet pressure (FIG. 20).

Referring again to FIG. 1 and FIG. 2, one embodiment of a high speed rotary ball valve 11 of the present invention includes a main valve body 21, an upstream seat 24 which is removably received into the interior cavity 27 of main valve body 21, a valve ball 25 that rotatably seats in interior cavity 27 in the interior of main valve body 21 between upstream seat 24 and downstream seat 23. Downstream seat 23 is removably received into interior cavity 27 and the assembly of upstream seat 24, valve ball 25, and downstream seat 23 is held in position in interior cavity 27 by downstream valve body 22 which is removably received into main valve body 21. Valve stem 26 is removably attached to valve ball 25 and extends through cavity 27 and through an opening 28 in main valve body 21. The portion of valve stem 26 extending vertically from main valve body 21 (as shown in FIG. 1) is available for coupling to a high speed actuator (not shown). Valve stem 26 is sealed using conventional gaskets, packing, rings, or other similar type sealing means.

The main valve body 21, the upstream seat 24, the downstream seat 23, the valve stem 26, the valve ball 25, and the downstream valve body 22 are fabricated from a suitable material, such as a carbon steel, a stainless steel, a ceramic, a ceramet (name used in trade), a carbide alloy, a plastic, or a combination thereof. Materials which resist corrosion and erosion when exposed to the process fluid are preferred.

The valve ball 25 includes a plurality of cylindrical central passageways 110 which extend horizontally (as viewed in FIG. 1) through the valve ball. The number of passageways is constrained by the diameter of valve ball 25 and the diameter of each passageway.

The diameter of the valve ball 25 and the cavity 27 are sized so that valve ball 25 is rotatable within the cavity 27 about a vertical axis 13. Valve ball 25 is supported by upstream seat 24 and downstream seat 23 and is free to rotate within cavity 27. Both upstream seat 24 and downstream seat 23 are surfaced with a conventional sealing material appropriate for rotation of the valve ball at a high speed such as glass filled PTFE.

Figure 11A:
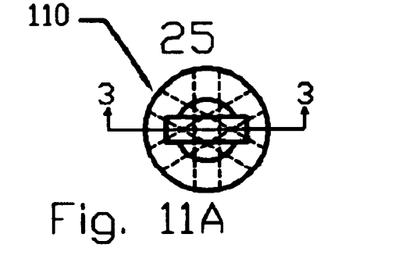
FIG. 11A shows a top view of the valve ball of the rotary valve 11 of the present invention.
Figure 11B:
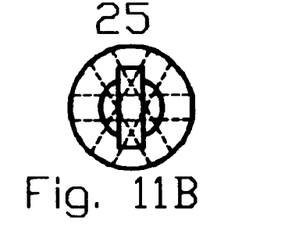
FIG. 11B shows another top view of the valve ball of the rotary valve 11 of the present invention.
Figure 11C:
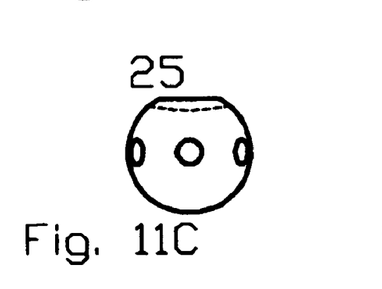
FIG. 11C shows a side view of the valve ball of the rotary valve 11 of the present invention.
Figure 11D:
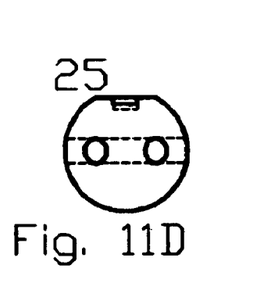
FIG. 11D shows another side view of the valve ball of the rotary valve 11 of the present invention.
Figure 12:
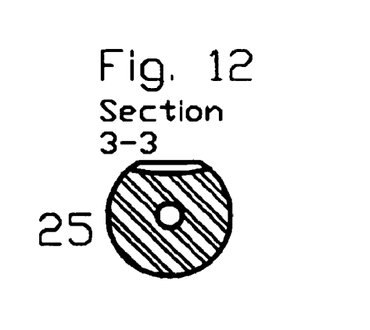
FIG. 12 shows a cross-sectional view, along section line "AA" of the valve ball of the rotary valve 11 of the present invention.

In one embodiment of the valve ball 25, as shown in FIG. 11A, valve ball 25 has three passageways 110 equally spaced around the circumference of the ball with each passageway 110 intersecting the vertical axis 13. Passageways 110 are coplanar, of equal diameter, and equally spaced about the circumference of valve ball 25. Valve ball 25 rotates about a vertical axis 13 that intersects each flow passageway at the center of the ball. As shown in the embodiment depicted in FIG. 11D, valve ball 25 has a slot milled in its top surface for receiving valve stem 26. As shown in FIG. 2, the diameter of each passageway 110 closely approximates the diameter of the discharge 141 of the downstream seat 23. It can be seen that, because of the positioning of the passageways 110, each 360 degree rotation of valve ball 25 results in six valve actuation cycles (a valve actuation cycle is defined as the valve going from a closed to an open position and back to closed). Therefore, in one embodiment of the invention, it is possible to achieve a six to one multiplier effect in that one complete rotation of valve stem 26 results in six valve actuation cycles. It is possible to increase or decrease this multiplier by increasing or decreasing the number of passageways 110 through the valve ball 25. Thus, a valve actuation cycle frequency of 2400 Hz can be achieved at a valve stem rotational speed of only 400 revolutions per second.

The multiplier effect is dependent upon the number of passageways through valve ball 25. For discontinuous flow (meaning the valve cycles between the fully open and the fully closed positions) it is necessary to include a separation between the passageways at least equal to the diameter of the discharge 141. In this method of operation, the multiplier effect is then limited by the diameter of the valve ball 25, and the diameter of the passageways through valve ball 25. Non-discontinuous flow profiles can be obtained by closer spacing of the flow passageways. The profile of the pressure pulse produced by each valve actuation cycle can also be modified by enlarging the entrance and exit of each passageway while maintaining the interior diameter of each passageway. This modification allows flow to begin sooner and end later for each valve actuation cycle.

FIG. 18 and FIG. 19 show operation of the valve of the present invention at a valve actuation cycle frequency of approximately 2300 Hz. At this speed, a sound pressure level of approximately 135 dB at a frequency of 2300 Hz is achieved. Similarly, FIG. 20 and FIG. 21 show operation of the valve of the present invention at a valve actuation cycle frequency of approximately 2200 Hz. At this speed, a sound pressure level of approximately 135 dB at a frequency of 2200 Hz is achieved. As can be seen, it is possible to produce high energy sound pressure levels at the same frequency as the valve actuation cycle frequency. Thus, by controlling valve actuation frequency, the resulting sound frequency can also be controlled. Any high-speed rotary actuator can be used to couple to valve stem 26 and provide rotary motion to valve ball 25.

In operation, a high pressure fluid such as, for example, air, steam, or a liquid, is supplied to the main valve body inlet 29. As valve ball 25 rotates, valve actuation cycles occur and, as shown in FIG. 18 through FIG. 21, downstream pressure pulses or perturbations are produced along with a sound pressure characterized by a characteristic frequency equal to the valve actuation cycle frequency.

Advantages

The previously described versions of the invention have many advantages including valve actuation cycle frequencies of over 2000 Hz, small valve sizes and simple valve construction, valve operation at inlet pressures of at least 600 psi, production of high amplitude flow perturbations, low head loss through the valve, simple piping connection design, and the production of high-energy sound at controllable frequencies.

Although the present invention has been described in considerable detail with reference to certain preferred versions thereof, other versions are possible. For example, the valve body may be composed of any other structure material capable of retaining valve ball 25 for rotational movement while also being capable of disassembly to allow maintenance, removal, and replacement of interior components of the valve assembly. Therefore, the spirit and scope of the appended claims should not be limited to the description of the preferred versions contained herein.

What is claimed is:

1. A rotary valve comprising:
   a. a valve body;
   b. a valve element rotatably disposed within said valve body, said valve element having an axis of rotation and a plurality of flow passageways therethrough, wherein all of said flow passageways are coplanar and substantially perpendicular to said axis of rotation; and
   c. means for continuously rotating said valve element within said valve body.

2. The rotary valve of claim 1 wherein said valve element is a ball having a circumference bisected by said axis of rotation.

3. The rotary valve of claim 2 wherein each of said passageways are equally spaced about said circumference.

4. The rotary valve of claim 1 wherein each of said passageways is linear.

5. The rotary valve of claim 1 wherein each of said passageways intersects at said axis of rotation.

6. A rotary valve comprising:
   a. a valve body having a flow passageway for a flow of fluid;
   b. an upstream valve seat and a downstream valve seat provided in said flow passageway;
   c. a valve ball, having an axis of rotation, rotatably disposed in said valve body between said upstream and downstream valve seats;
   d. said valve ball having a plurality of flow apertures therethrough, wherein all said flow apertures intersects at said axis of rotation; and
   e. means for continuously rotating said valve ball within said valve body.

7. The rotary valve of claim 6 wherein said flow apertures are coplanar.

8. The rotary valve of claim 6 wherein said flow apertures are equally spaced about a circumference of said valve ball.

9. The rotary valve of claim 6 wherein said flow apertures are equally sized.

10. The rotary valve of claim 6 wherein said flow apertures are configured such that said flow of fluid is discontinuous.

11. The rotary valve of claim 6 wherein said flow apertures are configured such that said flow of fluid is continuous.

12. The rotary valve of claim 6 wherein said flow apertures alternatively communicate with said flow passageway as said valve ball rotates about said axis of rotation.

13. A method of producing flow perturbations comprising:
   a. providing a valve body having an inlet and an outlet;
   b. providing a valve element, with an axis of rotation, rotatably disposed within said valve body between said inlet and said outlet,
   c. adapting said valve element to be continuously rotated within said valve body;
   d. providing said valve element with a plurality of passageways therethrough, wherein all of said passageways are coplanar, substantially perpendicular to said axis of rotation, and intersect at said axis of rotation; and
   e. providing means for rotating said valve element within said valve body whereby each 360 degree rotation of said valve element creates a plurality of flow perturbations.

* * * * *